United States Patent [19]

Davis

[11] Patent Number: 4,501,791
[45] Date of Patent: Feb. 26, 1985

[54] NON-WOVEN FABRIC FOR V-BELT BEAD WRAP AND CHAFER

[75] Inventor: Delbert A. Davis, Kernersville, N.C.

[73] Assignee: Burlington Industries, Inc., Greensboro, N.C.

[21] Appl. No.: 602,624

[22] Filed: Apr. 23, 1984

Related U.S. Application Data

[63] Continuation of Ser. No. 356,398, Mar. 9, 1982, abandoned.

[51] Int. Cl.$^3$ .............................................. B32B 27/00
[52] U.S. Cl. ................................... 428/286; 427/302; 427/333; 427/381; 427/393.5; 427/412; 428/284; 428/290; 428/423.7; 428/423.9; 428/492
[58] Field of Search ............... 428/284, 286, 290, 492, 428/423.7, 423.9; 427/302, 393.5, 385.5, 333, 381, 412; 156/910, 315

[56] References Cited

U.S. PATENT DOCUMENTS

| | | |
|---|---|---|
| 2,991,258 | 7/1961 | Haward et al. |
| 3,240,251 | 3/1966 | Atwell. |
| 3,297,468 | 1/1967 | Macura et al. |
| 3,503,845 | 3/1970 | Hollatz et al. ................ 428/423.9 |
| 3,775,150 | 11/1973 | McClary. |
| 3,861,980 | 1/1975 | Wise. |
| 3,984,366 | 10/1976 | Elmer. |
| 4,026,744 | 5/1977 | Elmer. |
| 4,040,999 | 8/1977 | Kalafus et al. |
| 4,051,281 | 9/1977 | van Gils et al. |
| 4,134,869 | 1/1979 | Kalafus et al. |
| 4,137,358 | 1/1979 | Hartz. |
| 4,248,938 | 2/1981 | Takata et al. ................ 428/423.9 |

*Primary Examiner*—James J. Bell
*Attorney, Agent, or Firm*—Cushman, Darby & Cushman

[57] ABSTRACT

A method for treating non-woven fabrics or fibers used in the manufacture of automobile tires and accessories, and the products produced by such method. In order to improve the adhesion qualities of fabrics used in the manufacture of pneumatic tires, particularly chafer strip and bead wrap constructions, to thereby reduce or eliminate the splitting and deterioration tendency of such products under high stress conditions, by impregnating the non-woven fabric with at least an equal amount of elastomer by fabric weight.

9 Claims, No Drawings

NON-WOVEN FABRIC FOR V-BELT BEAD WRAP AND CHAFER

This is a continuation of application Ser. No. 356,398, filed Mar. 9, 1982, abandoned.

BACKGROUND AND SUMMARY OF THE INVENTION

The present invention relates to a method for treating non-woven polyester, rayon, nylon or combinations of like fabrics for use in the manufacture of automobile tires and accessories such as V-belts, bead wrap, chafer strips and the like, in order to improve the adhesion qualities and overall strength of such fabrics.

It is a common practice in the manufacture of pneumatic tires, particularly automobile tires, to incorporate a chafer strip into the bead area of the tire to provide a sealing and seating surface on the tire bead which can be engaged to the rim of a wheel. Generally, such strips extend from an inner surface area of the annular tire bead to an outer surface area. Because of the relatively high stress conditions imposed at or near the bead area of automobile tires during normal use, non-woven fabrics presently available tend to split, resulting in a loss of sealing capability and tire failure. Such failures are due primarily to a lack of adhesion between the strip and tire surface and/or to the inadequate construction of, for example, the chafer strip itself. In the case of tubeless tires, both the sealing and seating functions of a chafer strip are of critical importance in ensuring prolonged tire safety and performance.

The splitting and deterioration problems of non-woven fabrics used in the manufacture of automobile tires and accessories is not limited to chafer strips. Under high stress conditions, similar problems are known to exist in the construction of conventional bead wrap and so-called "cushion" fabrics used to produce a variety of V-belts such as fan belts, air conditioning belts and the like. In all such cases, the splitting and deterioratiofn problems have generally been traced to the lack of cohesive strength in the body of the non-woven fabric and the surface of the bonded rubber component.

As an alternative to the use of woven fabrics, non-woven fabrics have been produced having desired extension characteristics when cut into long lengths so that a single length will form, for example, a complete chafer strip area of a bead. However, many of the known non-woven fabric constructions have proven unacceptable for chafer strip or bead wrap applications because of the limitations of the adhesive binder in the non-woven fabric. Typically, such strips are manufactured by overlaying thin sheets of web (usually at 90° angles to each other), bonding the sheets with certain known adhesives to form a laminated-type structure, and then drying the fabric in a heated environment. During the drying operation, however, the adhesives tend to migrate to the top and bottom surfaces of the non-woven laminate, leaving fiber layers in the interior which are bonded to a lesser degree than layers near the outside surfaces. The migration tendency of such fabrics often results in a delamination of the non-woven strip under normal use conditions, causing splitting or a premature loss in its strength and sealing characteristics. In addition, the laminated-type structures are more vulnerable to the relatively severe manufacturing process conditions encountered during subsequent production of the tire itself.

It is also known that chafer, bead wrap and V-belt products may be constructed from non-woven fabrics which are "spunlaced" or "tanglelaced" from staple fibers of any natural, cellulosic, or synthetic materials. The fibers of spunlaced fabrics, for example, are held together by random intangling and interlacing without any heat bonding of individual fibers, and are generally produced by processes using high energy fluid jets, such as those disclosed in U.S. Pat. Nos. 3,434,188; 3,485,706; 3,485,708; and 3,508,308. However, such methods, in addition to their increased expense of operation, require complex processing equipment and have not resulted in chafer strip or bead wrap constructions which are free from splitting, cracking or other deterioration under high stress conditions.

It has now been found that non-woven fabrics used in the manufacture of V-belt, bead wrap and chafer strip constructions may be produced such that their strength and adhesion qualities are significantly improved, thereby eliminating the premature splitting and deterioration problems associated with conventionally available products. In particular, it has been discovered that such fabrics may be treated with an adhesive system that will allow the subsequent bonding of an impregnating elastomeric polymer or other bonding composition (preferably compounded natural rubber) to the fibers of the non-woven fabric to thereby prevent such fabrics from splitting or deteriorating during prolonged use. In addition, the method according to the present invention results in fabric constructions that do not exhibit the adhesion problems associated with conventional prior art products.

In essence, the process according to the invention comprises the steps of pretreating of a non-woven fabric with an isocyanate compound; drying the fabric in a heated, closed environment to a maximum moisture content of 1 percent or less solvent media; applying a resorcinol/formaldehyde/vinyl pyridine adhesive (commonly known as "RFL"); subjecting the fabric to a second drying operation; and impregnating the non-woven fabric with a solvent solution of compounded natural rubber. Where applicable, the isocyanate step may be followed with the application of an elastomer such as neoprene, foregoing the applicaton of RFL. Also, the isocyanate step may be directly followed by an elastomer without drying the isocyanate before the application of the impregnating compound and subsequently drying the entire matrix.

The present invention is, therefore, a marked deviation from prior art laminated-type structures in that it results in a single, non-woven fabric having strength and adhesion characteristics due to a high degree of bonding between the non-woven fibers and impregnating compound. That is, the claimed construction, unlike laminated products which allow the adhesive compound to migrate to the top and bottom surfaces of the fabric, results in a non-woven chafer strip, bead wrap or V-belt fabric which is thoroughly and uniformly impregnated with the bonding material. It is this high degree of impregnation of the end product (i.e. of the treated non-woven fabric) which contributes to the unexpected increase in stability and strength of the fabric after it is bonded to a rubber surface and integrated, for example, into a pneumatic tire. The complete impregnation of the non-woven fabric effectively eliminates the deterioration problems associated with previously available non-woven fabric constructions used in the manufacture of pneumatic tires and forms a stronger, more cohesive structure having little or no tendency to split or separate, either within itself or from rubber or elastomeric materials to which it is subsequently bonded. The method and fabric according to the invention also provide a superior finishing strip for tire beads, particularly tubeless tires which must maintain an air-tight seal around the bead areas. Further, the uniform characteristics of cohesion and strength are not affected by subsequent tire manufacturing operations.

Thus, it is an object of the present invention to provide a method for treating non-woven fabrics used in the manufacture of automobile tires or V-belts in order to improve the adhesion qualities of such fabrics and to thereby eliminate their tendency to split or deteriorate under normal use. It is a further object of the present invention to provide for improved bead wrap, V-belt and chafer strip constructions for non-woven fabrics. Other features, objects and advantages of the subject invention will appear more fully from the following description of illustrative examples.

EXAMPLE I

A non-woven polyester chafer strip comprised of DuPont 8006 "Sontara Spunlace" was prepared by pretreating the fabric with isocyanate; drying the fabric to less than 1% moisture (from solvent media) by heating in a conventional drying oven for a period of approximately three minutes; applying a resorcinol/formaldehyde/vinyl pyridine adhesive; subjecting the fabric to a second drying operation (less than 1% solvent moisture content) for a period of approximately three minutes; and impregnating the fabric with a solvent (toluene) solution of compounded natural rubber. Following impregnation, two 4"×6" samples of the treated fabric, each having a thickness of 50 ml, were bonded to Goodyear and Firestone SBR stock using conventional bonding and curing means. The strips were then tested for overall adhesion and resistance to splitting utilizing a conventional Instron testing apparatus. The results of such tests are set forth below:

|  | Non-Woven Polyester Chafer Fabric Strip |
| --- | --- |
| GRAB TENSILE: |  |
| (pounds per inch of fabric width) | MD[1]-168 XMD[2]-100 |
| DIFFUSION: (psi) | OXO[3] |
| ADHESION: |  |
| (pounds per inch of fabric width) | Gy[4]-17; 8/30FB[5]; 15/30FB; FS[6]-7; 30FB |
| ADD-ON %:[7] | 136 |

NOTES:
[1]MD = Machine (Warp) Direction
[2]XMD = Cross Machine (Fill) Direction
[3]Read as "zero by zero"
[4]GY = Goodyear SBR Stock
[5]FB = Fabric Break
[6]FS = Firestone SBR Stock
[7]Percentage by Weight of Polymer or Natural Rubber Added to Fabric Matrix During Impregnation

EXAMPLE II

A non-woven polyester fabric for use as a bead wrap comprised of DuPont 8006 "Sontara Spunlace" was prepared and treated according to the processing conditions described in Example I above. Thereafter, two fabric samples were bonded to standard Goodyear and Firestone SBR stock to form bead wrap, and were then tested adhesion and resistance to splitting with the following results:

|  | Non-Woven Polyester Bead-Wrap |
| --- | --- |
| GRAB TENSILE: |  |
| (pounds per inch of fabric width) | MD-166 XMD-107 |
| TACK (GRAMS): | 1580 |
| ADHESION: |  |
| (pounds per inch of fabric width) | GY-63; FS-51FB; 62; 70FB |
| ADD ON %: | 200 |

EXAMPLE III

A third non-woven polyester fabric for use as bead wrap comprised of DuPont 8006 "Sontara Spunlace" was prepared in accordance with the treatment steps outlined in Example II. Thereafter, two samples were again bonded to standard SBR stock and tested for adhesion and resistance to splitting with the following results:

|  | Non-Woven Polyester Bead Wrap |
| --- | --- |
| GRAB TENSILE: |  |
| (pounds per inch of fabric width) | MD-162 XMD-113 |
| TACK (GRAMS): | 3495 |
| ADHESION: |  |
| (pounds per inch of fabric width) | GY-62; 64;70 FS-41; 36; 42FB |
| ADD ON %: | 214 |

EXAMPLE IV

A non-woven polyester fabric for use as V-belt cushion comprised of DuPont 8006 Sontara Spunlace was prepared by treating the non-woven fabric with a 4% solution of isocyanate, squeezing the excess solution from the fabric and immediately impregnating this fabric with a 45% solution of neoprene to an add-on of over 250 percent.

| GRAB TENSILE: |  |
| --- | --- |
| (pounds per inch of fabric width) | MD-134 XMD-85 |
| ADHESION: | 34 |
| (pounds per inch of fabric width) |  |
| ADD ON %: | 287 |

As the foregoing Examples make clear, the method according to the present invention makes possible a substantial increase in the amount of compounded natural rubber that is impregnated into the non-woven polyester fibers. In all cases, the amount of impregnation was found to be at least 50 percent by weight of the untreated fabric itself. As a result, fabric constructions treated in accordance with the foregoing steps exhibit substantially improved adhesion qualities and, correlatively, a significant increase in resistance to splitting and/or deterioration under high stress conditions.

While the invention herein is described in what is presently believed to be a practical, preferred embodiment thereof, it will be apparent that many modifications may be made within the scope of the invention, which scope is to be accorded the broadest interpretation of the appended claims so as to encompass all equivalent methods and fabrics.

What is claimed is:

1. A method for treating a non-woven fabric for subsequent rubber adhesion on pneumatic tires or V-belts consisting essentially of the steps of:
    pretreating said non-woven fabric with an isocyanate compound;
    drying said non-woven fabric a first time in a heated environment;
    applying an adhesive compound to said non-woven fabric;
    drying said non-woven fabric a second time in a heated environment; and
    applying an elastomeric compound to said non-woven fabric to thereby impregnate the fibers of said fabric with said elastomeric compound, the amount of said elastomeric comound being equal to or greater than 50 percent of the weight of said non-woven fabric.

2. A method according to claim 1, wherein said first drying of said non-woven fabric reduces the moisture content of said fabric to abut 1 percent by weight solvent.

3. A method according to claim 1, wherein said second drying of said non-woven fabric reduces the moisture content of said fabric to about 1 percent by weight solvent.

4. A method according to claim 1, wherein said elastomeric compound comprises a solvent solution of compounded natural rubber.

5. A method according to claim 1, wherein said adhesive compound comprises resorcinol/formaldehyde/latex bonding agents.

6. A method for treating a non-woven fabric for subsequent rubber adhesion on pneumatic tires or V-belts, which method comprises:
    pretreating said non-woven fabric with an isocyanate compound to chemically bond the synthetic fibers to the non-woven matrix;
    drying said non-woven fabric in a heated environment;
    applying an elastomeric compound to said non-woven fabric to thereby impregnate the fibers of said fabric with said compound; and
    thoroughly drying the applied elastomeric compound.

7. A treated non-woven fabric for use in the manufacture of pneumatic tires or V-belts, said treated non-woven fabric being formed by:
    applying an isocyanate compound to a non-woven fabric;
    drying said non-woven fabric a first time in a heated environment;
    applying an adhesive compound to said non-woven fabric;
    drying said non-woven fabric a second time in a heated environment; and
    impregnating said non-woven fabric with an elastomeric compound, the amount of said elastomeric compound being equal to or greater than 50 percent of the weight of said non-woven fabric.

8. A treated non-woven fabric according to claim 7, wherein said elastomeric compound comprises a solvent solution of compounded natural rubber.

9. A treated non-woven fabric according to claim 7, wherein said adhesive compound comprises resorcinol/formaldehyde/latex bonding agents.

* * * * *